United States Patent [19]

Hyvärinen

[11] 4,157,946

[45] Jun. 12, 1979

[54] PROCESS FOR SELECTIVE REMOVAL OF BISMUTH AND ANTIMONY FROM AN ELECTROLYTE, ESPECIALLY IN ELECTROLYTIC REFINING OF COPPER

[75] Inventor: Olli V. J. Hyvärinen, Pori, Finland

[73] Assignee: Outokumpu, Oy, Outokumpu, Finland

[21] Appl. No.: 947,849

[22] Filed: Oct. 2, 1978

[30] Foreign Application Priority Data

Oct. 11, 1977 [FI] Finland ................................. 772999

[51] Int. Cl.$^2$ ........................ C25C 1/12; C01B 27/00; C01B 29/00; C01F 11/46
[52] U.S. Cl. ..................................... 204/108; 75/108; 423/87; 423/554; 423/559

[58] Field of Search .......................... 75/108; 204/108; 423/87, 554, 559

[56] References Cited

U.S. PATENT DOCUMENTS

| | | | |
|---|---|---|---|
| 607,646 | 7/1978 | Marino | 204/108 |
| 3,914,163 | 10/1975 | Drinkard et al. | 204/108 |

Primary Examiner—R. L. Andrews
Attorney, Agent, or Firm—Brooks, Haidt, Haffner & Delahunty

[57] ABSTRACT

Antimony and bismuth are selectively removed from an electrolyte solution, especially a solution used for the electrolytic refining of copper by adding to the electrolyte solution a carbonate of barium, strontium, or lead.

6 Claims, No Drawings

PROCESS FOR SELECTIVE REMOVAL OF BISMUTH AND ANTIMONY FROM AN ELECTROLYTE, ESPECIALLY IN ELECTROLYTIC REFINING OF COPPER

BACKGROUND OF THE INVENTION

The present invention relates to a process by which the contamination of copper cathodes with bismuth, antimony and arsenic is prevented in the electrolytic refining of copper. Even very low contents of bismuth in the cathode (∼10 g/l) render further refining of copper by heat treatment impossible.

The electrolytic refining of copper occurs when an impure anode dissolves electrolytically and pure copper deposits on the cathode. The electrolyte used is an aqueous solution of copper sulfate which contains copper 35–50 g/l and sulfuric acid 150–230 g/l. The elements less noble than copper, such as nickel, iron, and zinc, dissolve in the electrolyte, whereas gold, silver, platinoids, selenium, and tellurium, which are metals nobler than copper, remain undissolved and form an anode slime which gradually drips to the bottom of the tank. Lead and tin, being base metals, dissolve first but precipitate immediately and remain in the slime, the former as lead sulfate and the latter as stannic hydroxide.

Arsenic, antimony and bismuth, present as impurities in the anode and having an electrochemical dissolution potential close to that of copper, constitute a group of their own.

Arsenic dissolves in practice totally in the electrolyte and is oxidized by atmospheric oxygen from a trivalent to a pentavalent ion.

Only part of the antimony and the bismuth, in practice about one half, dissolves in the electrolyte, the remainder remaining in the slime. The size of the proportion passing into the slime depends, at least to some extent, on the other impurities present in the anode. For example, if the anode contains a large amount of lead and/or tin, the amounts of antimony and bismuth bound in the slime increase.

Antimony and bismuth dissolve in the form of trivalent ions in the electrolyte. They precipitate from the solution as arsenates and so their solubility is determined by the concentration of arsenic in the solution; in addition, they tend to form supersaturated solutions.

The solubility of the arsenates of bismuth and antimony are discussed in the article "Factors affecting the quality of electrorefined cathode copper" by T. B. Braun, J. R. Rawling, and K. J. Richards (AIME, Las Vegas, 1976).

It is very dangerous for the operator of the electrolytic process if the arsenates precipitating from the solution, or oxy-compounds of these substances, form floating slurries and do not settle at the bottom of the tanks.

The contamination of the cathode can occur either when floating slurries adhere to the cathode or when arsenates deposit on the cathode surface directly from a supersaturated solution. The solubility of the arsenates of bismuth and antimony decreases with lowering temperature, and thus they deposit on the cathode from a supersaturated electrolyte if the temperature lowers by some degrees, even if locally.

Electrolyte is removed continuously from the copper refining circuit in order to control the concentrations of impurities dissolved in it. The impurities determining the rate of removal are nickel, arsenic, and iron. In practice, the control of the antimony and bismuth contents in the electrolyte by the control of electrolyte removal is not successful, since the necessary amounts to be removed are too large.

Two methods have been suggested for the removal of impurities from the electrolyte: (1) a selective adsorption of As, Sb, and Bi from the electrolyte by means of stannic acid (U.S. Pat. No. 3,696,012), whereby the treated electrolyte becomes undersaturated and the precipitation of arsenates is prevented and (2) the prevention of the formation of floating slurries by adding trivalent arsenic to the solution; this prevents the oxidation of antimony to a pentavalent form, the phenomenon which is regarded as the reason for the formation of floating slurries (U.S. Pat. No. 3,753,877).

The concentration of bismuth in the electrolyte must thus be maintained below a certain limit in order to prevent its depositing on the cathode. On the basis of experience it can be said that the probability of bismuth depositing on the cathode is very small when the concentration of bismuth in the electrolyte is less than 100 mg/l. This concentration is reached under the normal conditions of an electrolysis, when the bismuth concentration in the anode surpasses 50 g/t. The problems caused by bismuth appear when the concentration in the anode surpasses 100 g/t, and the production of a high-grade cathode is difficult when the concentration in the anode is over 200 g/t. The above limits as regards the anode are indicative, since the solubility and precipitation of bismuth are determined by many factors, such as the composition of the anode, the composition of the electrolyte, the temperature, and the amount and nature of the anode slime produced. It can be said, however, that if the concentration of bismuth in the electrolyte can be maintained below a certain limit (∼100 mg/l), bismuth will not interfere with the electrolysis.

On the basis of experience, the concentration of antimony in the electrolyte can be 300 mg/l without interfering with the electrolysis. This corresponds to a concentration of 100–200 g/t in the anode, depending on the same factors as those discussed above. When the concentration in the anode surpasses 200 g/t, the antimony may cause problems when its concentration in the electrolyte increases by 500–600 mg/l. If the anode contains antimony more than 400 g/t, the production of a high-grade cathode by normal technology is considered difficult.

In the German lay-open print No. 2,548,620 there is disclosed a method for the preparation of very pure electrolyte copper, whereby the copper sulfate solution is exposed to a two-staged solution refining before its feeding into the electrolysis circulation. The first stage, which is oxidating, is carried out at a pH-value 2.7 to 3.3 and is maintained at this pH-value by adding sulphuric acid binding materials, which precipitate as sulfates. At the first stage also impurities such as Fe, As, Sb, Bi etc. precipitate. Antimony and bismuth precipitate relatively easily at the pH-value 2.7 to 3.3. Their precipitation from electrolyte solutions, in which the pH is below 0 has, however, proven difficult.

The object of this invention is thus to provide a method for the selective removal of antimony and bismuth from electrolyte solutions, which contain very large amounts, 150 to 230 g/l, sulfuric acid.

The object of the present invention is furthermore to provide a process in which bismuth and antimony are removed from the electrolyte so as to maintain their concentrations in the electrolyte below certain limits (Bi<100 mg/l, Sb<300 mg/l), whereby the depositing of these elements on the cathode is prevented even if anodes of high concentrations are used (Bi>100 g/t, Sb>200 g/t).

SUMMARY OF THE INVENTION

According to the invention bismuth and antimony are precipitated from the electrolyte by means of poorly soluble sulfates. Such poorly soluble sulfates include the sulfates of barium, strontium, and lead sulfate. They can be added to the electrolyte as sulfates, but the effectiveness of the process is improved if they are added to the electrolyte in the form of some other salt, preferably carbonate, which decomposes under the effect of the acid of the electrolyte, and thus no excess ions are left in the electrolyte.

DESCRIPTION OF THE PREFERRED EMBODIMENTS

The most advantageous method is to feed electrolyte into a separate mixing reactor, into which a carbonate of barium, strontium or lead is added. The forming sulfate precipitate co-precipitates the bismuth and part of the antimony. The precipitate is separated by filtration, and the clarified electrolyte is returned to the circulation of the copper electrolysis. Calcium carbonate cannot be used as the precipitating reagent, for it must be noted that the electrolyte becomes saturated with calcium, which causes a gypsum precipitate to form in the pipes of the circulation system.

Since the objective is to maintain the concentrations of antimony and bismuth only below the saturation limit, it is not necessary to treat the entire volume flow of the circulating solution, but a portion of it is directed to purification and then returned to the circulating solution. The impurity level in the circulating solution is in that case determined, in addition to other factors, by the amount of solution to be taken for purification and the amount of reagents used for the purification.

The invention is illustrated by means of the following examples:

EXAMPLE 1

Electrolyte from the electrolytic refining of copper was taken into a glass vessel provided with a thermostat and propeller agitation. The composition of the electrolyte was 43 g/l Cu, 180 g/l $H_2SO_4$, and 2.4 g/l As, and the temperature was maintained at 60° C.

2-6 g/l $BaCO_3$ was added to the electrolyte during the different tests. After a reaction period of half an hour, the electrolyte was filtered. The table below shows the concentrations of Bi and Sb in the electrolyte before and after the experiments.

| $BaCO_3$ g/l | Bi mg/l | Sb mg/l |
|---|---|---|
| — | 115 | 235 |
| 2 | 80 | 226 |
| 4 | 46 | 224 |
| 6 | 19 | 224 |

EXAMPLE 2

Electrolyte was pumped at a rate of 13 m³/h from the electrolyte circulation tank into a reactor having a volume of 10 m³ and a propeller agitator. The temperature of the feed was 58°–60° C., and the reactor had (direct) steam heating which maintained the temperature of the solution at 65°–68° C. The overflow from the reactor was filtered using a pressure filter, and the clarified solution was returned to the electrolyte circulation tank.

$BaCO_3$ was fed into the reactor continuously at a rate of 2 kg/m³. At the beginning of the experiment, the bismuth concentration in the electrolyte fed into the reactor was 106 mg/l and the antimony concentration 268 mg/l. After two hours, the concentrations in the outlet filtrate reached stationary values of Bi=51 mg/l and Sb=258 mg/l.

After four hours, the feed of $BaCO_3$ was increased to 4 kg/m³. Thereby the concentrations in the outlet electrolyte changed to Bi=13 mg/l and Sb=251 mg/l.

The experiment was discontinued after eight hours, at which time the concentrations in the circulating electrolyte, total volume approx. 400 m³, had decreased to Bi=87 mg/l and Sb=264 mg/l.

The barium sulfate precipitate washed with water contained on the average 2.5% Bi, 0.2% Sb, and 0.2% As.

EXAMPLE 3

As Example 1, but Ba hydroxide was added.

| $Ba(OH)_2.8 H_2O$ g/l | Bi mg/l | Sb mg/l |
|---|---|---|
| — | 159 | 300 |
| 1 | 111 | 290 |
| 2 | 70 | 280 |
| 4 | 14 | 270 |

The precipitate formed was very finely divided and poorly filtrable.

EXAMPLE 4

As Example 1, but Pb carbonate was added.

| $PbCO_3$ g/l | Bi mg/l | Sb mg/l |
|---|---|---|
| — | 120 | 280 |
| 1 | 110 | 275 |
| 2 | 90 | 271 |
| 4 | 60 | 260 |

What is claimed is:

1. A process for the selective removal of antimony and bismuth from an electrolyte solution containing at least 150 g/l $H_2SO_4$, comprising adding to the electrolyte solution a salt of a cation selected from the group consisting of barium, strontium and lead to precipitate said cation from the solution as a poorly soluble sulfate, co-precipitating the bismuth and antimony.

2. The process of claim 1, in which the salt is a carbonate.

3. The process of claim 2, in which a maximum of 20 g of $BaCO_3$/one liter of electrolyte solution is added to the electrolyte solution.

4. The process of claim 1, comprising performing the co-precipitation in a side flow of the electrolyte solution; separating the precipitate from the side flow; and recycling the side flow to the electrolysis.

5. The process of claim 1, in which the temperature of the solution is 20°–90° C. during the co-precipitation.

6. The process of claim 1, in which the electrolyte solution is a solution used for the electrolytic refining of copper.

* * * * *